US008358846B2

(12) United States Patent (10) Patent No.: US 8,358,846 B2
Gibbs (45) Date of Patent: Jan. 22, 2013

(54) SCANNING IMAGES FOR PORNOGRAPHY

(75) Inventor: Nicholas Gibbs, Gloucester (GB)

(73) Assignee: Symantec Corporation, Mountain View, CA (US)

( * ) Notice: Subject to any disclaimer, the term of this patent is extended or adjusted under 35 U.S.C. 154(b) by 1162 days.

(21) Appl. No.: 11/984,093

(22) Filed: Nov. 13, 2007

(65) Prior Publication Data

US 2009/0123064 A1 May 14, 2009

(51) Int. Cl.
*G06K 9/00* (2006.01)
(52) U.S. Cl. ....................................................... 382/181
(58) Field of Classification Search .................. None
See application file for complete search history.

(56) References Cited

U.S. PATENT DOCUMENTS

| 6,751,348 | B2 * | 6/2004 | Buzuloiu et al. | 382/165 |
|---|---|---|---|---|
| 2002/0059221 | A1 * | 5/2002 | Whitehead et al. | 707/5 |
| 2006/0067575 | A1 * | 3/2006 | Yamada | 382/176 |
| 2007/0116328 | A1 * | 5/2007 | Sablak et al. | 382/103 |

OTHER PUBLICATIONS

Forsyth and Fleck, "Automatic Detection of HUman Nudes", International Journal of Computer Vision, 32(11):63-77, Aug. 1999.*
Lee et al., "Non-retrieval: blocking pornographic images", Proceedings of the International Conference on the Challenge of IMage and Video Retrieval, Lecture Notes in Computer Science vol. 2383, Spring, London (2002), pp. 50-60.*
Forsyth and Fleck, "Automatic Detection of Human Nudes", International Journal of Computer Vision, 32(1):63-77, Aug. 1999.
Jones and Rehg, "Statistical Color Models with Application to Skin Detection", International Journal of Computer Vision, 46(1):81-96, Jan. 2002.
Bosson et al, "Non-retrieval: blocking pornographic images", Proceedings of the International Conference on the Challenge of Image and Video Retrieval, Lecture Notes in Computer Science vol. 2383, Spring, London (2002), pp. 50-60.
Lee et al, "Naked Image detection based on adaptive and extensible skin color model", Pattern Recognition, vol. 40, Issue 8, Aug. 2007, pp. 2261-2270.
Wang et al, "System for screening objectionable images using Daubechies' wavelets and color histograms" in Proc. Of the International Workshop in Interactive Distributed Multimedia Systems and Telecommunications Services, pp. 20-30, 1997.

* cited by examiner

*Primary Examiner* — Matthew Bella
*Assistant Examiner* — Fred Hu
(74) *Attorney, Agent, or Firm* — McKay and Hodgson, LLP; Serge J. Hodgson

(57) ABSTRACT

Heuristic analysis of image is performed to detect pornographic content. Pixels of an image representing a flesh-tone are identified. A heuristic analysis of the image is performed to classify the image as being pornographic or not. The analysis uses measures of a set of predetermined characteristics of the identified pixels as a heuristic to indicate a likelihood that the identified pixels contain pornographic content or not. Particular characteristics used are: the thickness of a region of identified pixels; the area of regions of adjacent identified pixels; the flatness of regions of adjacent identified pixels; the distance of pixels from the center of the image; the degree of texture of regions adjacent identified pixels; the likelihood of the identified pixels being flesh-tone, and the area of the identified pixels. The heuristic analysis is layered, comprising a plurality of tests, each test using the set of predetermined characteristics with differing degrees of significance attributed to each characteristic.

54 Claims, 7 Drawing Sheets

SCANNING IMAGES FOR PORNOGRAPHY

BACKGROUND OF THE INVENTION (1) Field of the Invention

The present invention relates generally to the field of controlling content distributed over a computer network. It relates specifically to content in the form of computer images and to scanning such images for pornography.

(2) Description of Related Art

Computer networks such as the internet are now used to distribute vast amounts of content. Some of the content is objectionable for a variety of reasons and consequently technology has been developed to control what content is distributed. Systems which perform content control may be implemented in a range of manners at a range of locations in a computer network, for example located in a gateway at a node of a network which controls the passage of various types of object or associated with a browser for displaying web pages.

There are many types of objectionable content, but pornographic content is of particular significance, there being in practice vast amounts of pornography distributed over computer networks. In order to control distribution, it is necessary first scan distributed content to detect the objectionable content. Detection of pornographic content in images poses particular technical difficulties. It is intrinsically difficult for an automated system to distinguish between images which do and do not contain pornographic content.

Such scanning of images faces competing requirements. One requirement is that the scanning is robust and accurate. There must be good performance in detecting pornographic content, for example providing a good detection rate and a low false positive rate. However there are practical limitations which tend to compete with performance. One such limitation is latency. In many situations, such as the scanning of web pages, it is desired to provide a low latency. Another such limitation, although in some situations of less significance than latency, is the cost of resources (e.g. memory, processing power) of performing the scanning. Such practical limitations tend to reduce the availability of complicated analysis techniques which might theoretically provide good performance.

One type of possible technique uses pixels of an image which represent a flesh-tone as a heuristic indicating a likelihood that an image contains pornography. This is simply because pornographic images frequently contain relatively large amounts of flesh-tone. With such a technique, typically there is performed a heuristic analysis which classifies the image as being pornographic or not using measures of predetermined characteristics of the identified pixels to indicate a likelihood that the identified pixels contain pornographic content or not.

However, the performance of any such heuristic analysis is limited. Such heuristic analysis, by its very nature, is not totally accurate and can incorrectly classify images. For example, considering solely the heuristic of flesh-tone, some images containing pornographic content may contain relatively small amounts of flesh-tone and, vice versa, some images not containing pornographic content may contain relatively large amounts of flesh-tone, tending to lead to misclassification of such images.

The present invention is concerned with techniques which improve the performance of such heuristic analysis.

BRIEF SUMMARY OF THE INVENTION

According to a first aspect of the present invention, there is provided a method of scanning images for pornographic content, the method comprising:

identifying pixels of an image representing a flesh-tone; and performing a heuristic analysis of the image which classifies the image as being pornographic or not using measures of predetermined characteristics of the identified pixels to indicate a likelihood that the identified pixels contain pornographic content or not, wherein one of the characteristics is the thickness of a region of identified pixels, the measure of said thickness being used to indicate a likelihood that the region of identified pixels contains pornographic content which decreases when the measure of said thickness decreases.

It has been found that relatively thin regions of flesh-tone within an image are not indicative of pornographic content, as compared to wider regions of flesh-tone. Accordingly the ability to detect pornography is improved by the use of the thickness of such regions as measure to indicate a likelihood that the region of identified pixels contains pornographic content which decreases when the measure of said thickness decreases.

For simplicity, this may be achieved by treating thin regions of flesh-tone as irrelevant. By removing such thin areas of flesh-tone content, then more clean regions than regions containing pornographic content are discarded, thereby improving the ability to correctly detect pornography. In this case, thin regions of identified pixels which have a thickness, for example normalised by a characteristic dimension of the image, less than a predetermined threshold are identified as irrelevant. The image is classified using measures of a subset of at least one predetermined characteristic of the identified pixels excluding the irrelevant regions.

According to a second aspect of the present invention, there is provided a method of scanning images for pornographic content, the method comprising:

identifying pixels of an image representing a flesh-tone; and performing a heuristic analysis of the image which classifies the image as being pornographic or not using measures of predetermined characteristics of the identified pixels to indicate a likelihood that the identified pixels contain pornographic content or not, wherein one of the characteristics is the area of a region of adjacent identified pixels, the measure of said area being used to indicate a likelihood that the region of identified pixels contains pornographic content which decreases when the measure of said area decreases.

It has been found that relatively small regions of flesh-tone within an image are not indicative of pornographic content, as compared to larger regions of flesh-tone. Accordingly the ability to detect pornography is improved by the use of the area of regions of adjacent pixels representing flesh-tone as measure to indicate a likelihood that the region of identified pixels contains pornographic content which decreases when the measure of said thickness decreases.

For simplicity, this may be achieved by treating small regions of flesh-tone as irrelevant. By removing such small regions of flesh-tone content, then more clean regions than regions containing pornographic content are discarded, thereby improving the ability to detect pornography. In this case, small regions of identified pixels which have an area, for example expressed normalised by the total area of the image, less than a predetermined threshold are identified as irrelevant. The image is classified using measures of a subset of at least one predetermined characteristic of the identified pixels excluding the irrelevant regions.

According to a third aspect of the present invention, there is provided a method of scanning images for pornographic content, the method comprising:

identifying pixels of an image representing a flesh-tone; and performing a heuristic analysis of the image which classifies the image as being pornographic or not using measures of predetermined characteristics of the identified pixels to indicate a likelihood that the identified pixels contain pornographic content or not, wherein one of the characteristics is the curvature of a region of adjacent identified pixels, the measure of the curvature being used to indicate a likelihood of the identified pixels contain pornographic content which increases when the measure of curvature increases.

It has been found that relatively curved regions of flesh-tone within an image are indicative of pornographic content and conversely relatively flat regions are not. Pornographic content often contains large areas of naked human body parts. Such human body parts are generally curved, and in particular more curved than non-pornographic artificial man-made surfaces or computer generated backgrounds which happen by chance represent a colour which is a flesh-tone. Accordingly the ability to detect pornography is improved by the use of the curvature of a region of adjacent identified pixels as a measure to indicate a likelihood that the identified pixels contain pornographic content which increases when the measure of curvature increases, because the measure of curvature tends to discriminate between images of body parts and images of objects which are not body parts although a flesh-tone colour.

For simplicity, this may be achieved by treating flat (i.e. non-curved) regions of flesh-tone having a high measure of flatness as irrelevant. By removing such flat regions of flesh-tone content, then relatively more clean regions than regions containing pornographic content are discarded, improving the ability to detect pornography. In this case, flat regions of identified pixels which have a measure of curvature less than a predetermined threshold are identified as irrelevant. The image is classified using measures of a subset of at least one predetermined characteristic of the identified pixels excluding the irrelevant regions.

A simple measure of curvature can be taken as the standard deviation of a grey scale, for example brightness, of the pixels in the region of adjacent identified pixels.

According to a fourth aspect of the present invention, there is provided a method of scanning images for pornographic content, the method comprising:

identifying pixels of an image representing a flesh-tone; and performing a heuristic analysis of the image which classifies the image as being pornographic or not using measures of predetermined characteristics of the identified pixels to indicate a likelihood that the identified pixels contain pornographic content or not, wherein one of the characteristics is a distance of identified pixels from the centre of the image, the measure of a distance of identified pixels from the centre of the image being used to indicate a likelihood of the identified pixels contain pornographic content which decreases when the measure increases.

It has been found that regions of flesh-tone within an image relatively distant from the centre of the image are not indicative of pornographic content. Pornographic imagery often contains large areas of naked human skin. These areas of skin are usually located towards the centre of the image when compared to other clean areas of images which happen by chance represent a colour which is a flesh-tone. Accordingly, the ability to detect pornography is improved by the use of a distance of identified pixels from the centre of the image as a measure to indicate a likelihood of the identified pixels contain pornographic content which decreases when the measure increases.

For simplicity, this may be achieved by treating distant regions of flesh-tone having regions of adjacent identified pixels having a high measure of a distance of the pixels from the centre of the image as irrelevant. By removing such distant regions of flesh-tone content, then relatively more clean regions than regions containing pornographic content are discarded, improving the ability to detect pornography. In this case, regions of adjacent identified pixels having a measure of a distance of pixels of the region from the centre of the image greater than a predetermined threshold are identified as irrelevant. The image is classified using measures of a subset of at least one predetermined characteristic of the identified pixels excluding the irrelevant regions.

According to a fifth aspect of the present invention, there is provided a method of scanning images for pornographic content, the method comprising:

identifying pixels of an image representing a flesh-tone; and performing a heuristic analysis of the image which classifies the image as being pornographic or not using measures of predetermined characteristics of the identified pixels to indicate a likelihood that the identified pixels contain pornographic content or not, wherein one of the characteristics is the texture of a region of adjacent identified pixels, the measure of the degree of texture being used to indicate a likelihood of the identified pixels contain pornographic content which decreases when the measure of the texture increases.

It has been found that relatively textured regions of flesh-tone within an image are not indicative of pornographic content. Pornographic imagery often contains large areas of naked human skin. These areas of skin are usually smooth and have a low texture when compared to other clean areas of images which happen by chance represent a colour which is a flesh-tone. Accordingly, the ability to detect pornography is improved by the use of the degree of texture of a region of adjacent identified pixels as a measure to indicate a likelihood of the identified pixels contain pornographic content which decreases when the measure of the degree of texture increases, because the measure of texture tends to discriminate between images of body parts and images of objects which are not body parts although a flesh-tone colour.

For simplicity, this may be achieved by treating textured regions of flesh-tone having a high measure of the texture as irrelevant. By removing such textured regions of flesh-tone content, then relatively more clean regions than regions containing pornographic content are discarded, improving the ability to detect pornography. In this case, textured regions of identified pixels which have a measure of the texture greater than a predetermined threshold are identified as irrelevant. The image is classified using measures of a subset of at least one predetermined characteristic of the identified pixels excluding the irrelevant regions.

Advantageously, the measure of the texture is one of Laws' texture measures.

According to a sixth aspect of the present invention, there is provided a method of scanning images for pornographic content, the method comprising:

identifying pixels of an image representing a flesh-tone; and performing a heuristic analysis of the image which classifies the image as being pornographic or not using measures of a set of predetermined characteristics of the identified pixels to indicate a likelihood that the identified pixels contain pornographic content or not, wherein the heuristic analysis comprises performing a plurality of tests, each test using the set of predetermined characteristics, with degrees of significance attributed to each characteristic which are different within each test, to derive a result that the image is pornographic or not, and classifying the image as being pornographic or not on the basis of a combination of the results of the plurality of tests.

One could consider a heuristic analysis involving the performance of a test using a set of predetermined characteristics, the image being classified as being pornographic or not on the basis thereof. Within the test, each characteristic is attributed with a certain degree of significance. For example, the test might involve generation of a measure for each characteristic and a comparison of the measures with fixed thresholds. Such a test will correctly identify a certain proportion of images and can be optimised using a reference corpus of images previously classified as containing pornographic content or not.

Unfortunately heuristic analysis, by its very nature, is not totally accurate and can incorrectly classify images. As a heuristic test is effectively a Boolean determinant of whether an image is pornographic or not, it is easy to misclassify images which lie at the boundaries of the heuristic test. For a given set of characteristics, even with theoretically perfect optimisation against a reference corpus, the classification will inevitably not be perfect in the sense that any particular detection rate will be associated with a certain false positive rate. In general terms, adjustment of the significance of one characteristic to increase the detection rate will generally also result in some false positive detection.

However, the sixth aspect of the present invention allows the heuristic analysis to be improved by performing a plurality of tests. Each test uses the set of predetermined characteristics, but with degrees of significance attributed to each characteristic which are different within each test. For example, as between two of the tests, one characteristic may be more significant in the first test and another characteristic may be more significant in the second test. Each test derives a result that the image is pornographic or not, and the image is classified as being pornographic or not on the basis of a combination of the results of the plurality of tests. In the most simple implementation, the image is classified as being pornographic if any one test provides the result that the image is pornographic and the image is classified as not pornographic otherwise. However, the results may be combined in other ways, for example by requiring plural tests to be passed.

By so combining a plurality of tests, the performance of the heuristic analysis can be improved in the sense of achieving a better false positive rate for a given detection rate, or vice versa. The tests can be thought of as being layered on top of each other each to identify increasing numbers of images containing pornography. By way of example, some tests may identify the most common types of pornographic content, while other tests which are more lenient in some ways and more stringent in other ways may identify less common types of pornographic content. The varying significance of the characteristics within the different tests, allows each test to be optimised be more precise in its discrimination task. This can be thought of as each test classifying a different subset of pornographic content. Thus, for a given set of characteristics, it is possible for the overall heuristic analysis to achieve higher performance than for a single test.

According to further aspects of the present invention, there are provided scanning systems implementing similar methods.

An embodiment of the present invention will now be described by way of non-limitative example with reference to the accompanying drawings.

DETAILED DESCRIPTION OF THE INVENTION

For illustrative purposes, some of the drawings contain pornographic images. For decency, parts of the original images have been blanked out although this is of course not the case in the original images.

Figure 1:
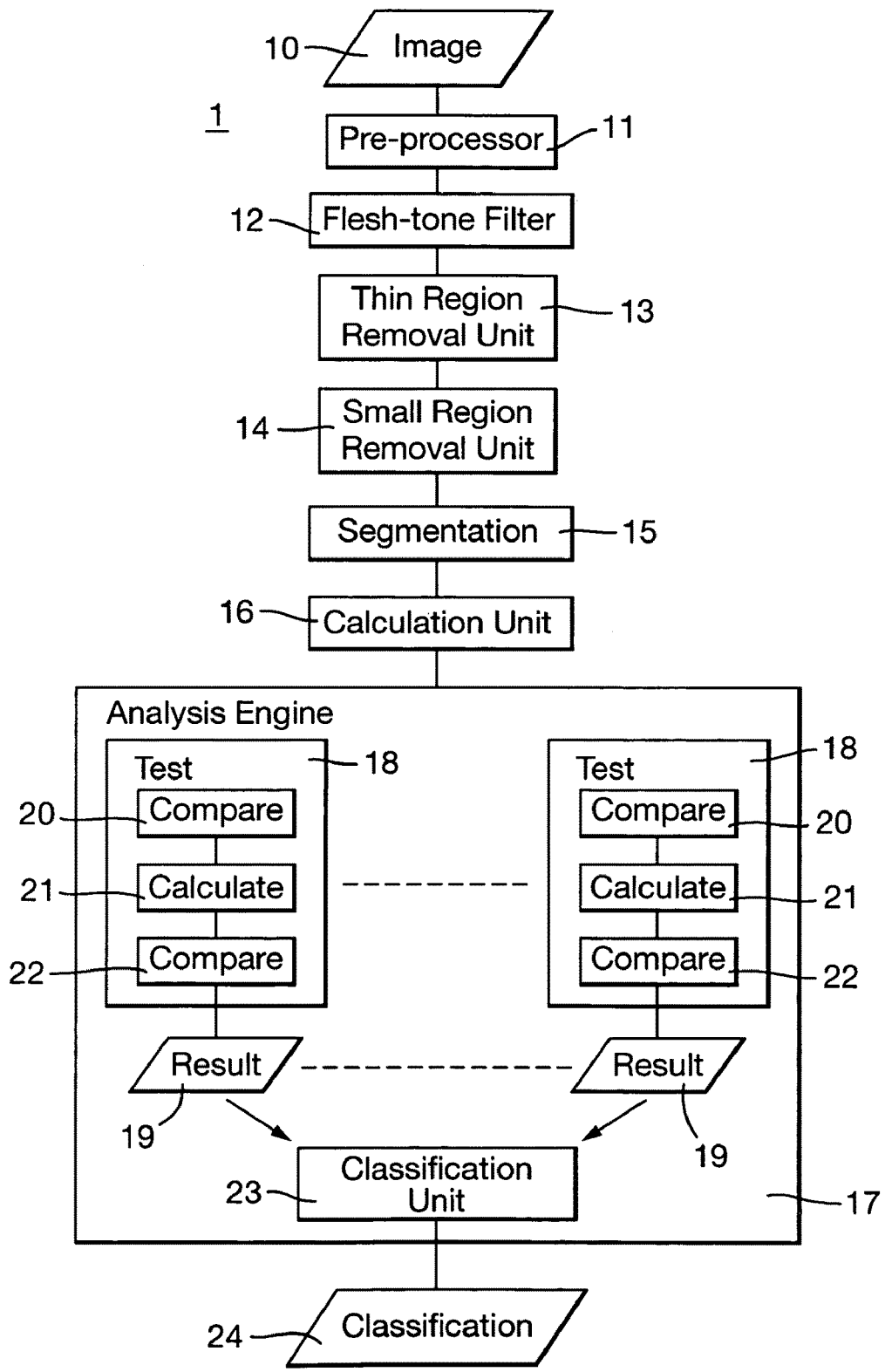
FIG. 1 is a diagram illustrating the operation of a scanning system.

A scanning system 1 for scanning images 10 to detect pornographic content is shown in FIG. 1. The scanning system 1 performs a heuristic analysis of individual images 10 which classifies the image 10 as containing pornographic content or not. The resultant classification is stored in a memory. The scanning system 1 is implemented as part of a content control system in which the distribution of the image 10 is controlled in dependence on the classification. If the classification is that the image 10 does not contain pornographic content, then the image 10 is allowed to pass. If the classification is that the image 10 does contain pornographic content, then remedial action is taken. The remedial action may be to prevent passage of the image 10, for example by preventing passage of a message in which it is contained or by deletion of the image 10 from the message, or may be to notify someone such as a system administrator.

The scanning system 1 may be applied to a range of situations.

One possible implementation of the scanning system 1 is at the node of a network which is typically the internet, but may in principle be any other form of network. In this case, the scanning system 1 processes images which have been extracted from messages which are delivered over the network. The messages may be emails, for example delivered using the SMTP protocol, or any other type of message being delivered across a network, for example HTTP traffic, FTP traffic, IM traffic, SMS traffic or MMS traffic. The image 10 may be contained in a single message or in a stream of messages.

Another possible implementation is in the context of web browsing. In this case, the scanning system 1 scans images 10 contained in a webpage being distributed for display by a browser. The scanning system 1 may be implemented in the same computer as the browser or in a different computer, for example a server or gateway through which the webpage is delivered.

The scanning system 1 is implemented in any suitable computer system, as appropriate for the application.

The scanning system 1 performs an analysis as follows.

The scanning system 1 can process images 10 of a wide range of common image formats, including without limitation Windows bitmap, JPEG, GIF, and TIFF. To accommodate compressed and non-raster formats, the image 10 is first supplied to a pre-processor 11 which processes the image 10 in accordance with its format to derive the RGB values (Red-Green-Blue values) of the pixels of the image data. Alternatively other colour spaces could be used.

Next, the image 10 is supplied to a flesh-tone filter 12 which performs a process of identifying or extracting pixels of the image 10 which represent a flesh-tone. The flesh-tone filter 12 also derives a likelihood ratio or probability that each pixel represents a flesh-tone. This processing is performed by comparing the value of each pixel with a histogram stored in the flesh-tone filter 12. The histogram provides, for any value of the pixel, a likelihood ratio that the value of the pixel represents a flesh-tone. If the likelihood ratio exceeds a given threshold, the flesh-tone filter 12 identifies the pixel as representing a flesh-tone. This result is stored, together with the likelihood ratio itself which is used later in the operation of the scanning system 1.

The derivation of the histogram for use in the flesh-tone filter 12 will now be described.

The histogram is derived from a reference corpus of image extracts which have been manually classified as being skin or not skin, based on visual examination. Ideally the reference corpus contains as many examples as possible.

In respect of each set of image extracts (skin and non-skin), the numbers of pixels of each possible colour value are counted and normalised for the total number of pixels in the respective image set. The likelihood ratio of a given pixel colour representing flesh-tone is then calculated by dividing the normalised pixel count for that colour in the skin set, by the normalised pixel count for that colour in the non-skin set. However, instead of using likelihood ratios, the probability of a given pixel colour representing flesh-tone could alternatively be calculated.

The threshold used by the flesh-tone filter is typically 1 so that a pixel is identified as representing a flesh-tone if its probability of being flesh-tone is higher than its probability of being non-flesh-tone. However, other weightings between flesh-tone and non-flesh-tone could be used. For example, the threshold may be varied, or alternatively the weighting can vary over the range of possible colour values.

However this approach to implementation of the flesh-tone filter 12 is not limitative. Alternative approaches are as follows.

The width of the bins of the histograms may be varied. Use of relatively wide bins smoothes the distribution of the colour probability profiles. For example, when using RGB values with a range of 0-255 to define a colour, a total of 255×255×255 possible different RGB combinations and 16,581,375 alternative colours are available. To smooth the distribution of the skin-tone probability histogram, the RGB values are typically summed in wider bins. In the RGB space, a preferred bin size is 16 units, which gives a total of 16×16×16 RGB combinations and 4096 possible colours.

Instead of using RGB values, any other colour space could be used, for example Hue-Saturation-Brightness.

An alternative approach to normalising the flesh-tone profile against a non-flesh-tone profile is to take the normalised pixel count in the flesh-tone set as the probability that a given colour is flesh-tone and to identify a pixel as representing flesh-tone if the count is above a given threshold. Although this alternative approach is less effective, it still has the effect of avoiding classing uncommon flesh-tones as being flesh-tone.

The image 10 from the flesh-tone-filter 12 consists of pixels representing flesh-tone. Generally speaking, the presence of such pixels are indicative of the image 10 containing pornographic content. The image 10 is subsequently processed to perform a heuristic analysis of these pixels to derive measures of various characteristics which are used to classify the image 10 as containing pornographic content or not.

First, the image 10 is supplied to a thin region removal unit 13 which processes the image 10 to detect and remove thin regions of the pixels identified by the flesh-tone-filter 12.

In particular, the thin region removal unit 13 analyses the pixels identified by the flesh-tone-filter 12 to determine the thickness of all the regions of the pixels in the vertical and horizontal directions. This may performed simply by parsing the image 10 row-by-row and column-by-column and counting the number of adjacent flesh-tone pixels in these directions.

The thickness the regions of pixels is compared to a threshold. Any region of flesh-tone pixels having a thickness less than the threshold is removed from the image 10 and excluded from subsequent consideration.

The thickness of the regions and the threshold may be normalised by a characteristic dimension of the image such as width, in the case of rows, or height, in the case of columns. In this case, the threshold is typically 10% or less, and is typically 1% or more, such percentages being percentage of the characteristic dimension. Preferably, the threshold is 6%.

As the basis for the percentage threshold, instead of using the width and height in respect of the thickness in the horizontal and vertical directions, any other characteristic dimension could be used, for example just the width or just the height in respect of the thickness in both directions, or the average of the width and height in respect of the thickness in both directions.

As an alternative to normalising the thickness, the threshold may be an absolute number of pixels.

For ease of processing, analysis of the rows and columns may be performed sequentially, for example by parsing and thresholding the image 10 row-by-row and parsing and subsequently thresholding the image 10 column-by-column. An alternative approach involves a recursive analysis of rows and columns, until no more thin regions can be removed.

The low thickness thus detected is indicative of a reduced likelihood that the flesh-tone region contains pornographic content. This is because flesh-tone regions in pornographic images are typically relatively extensive. In accordance with this reduced likelihood, the removal of the thin regions effectively reduces to zero the contribution of the thin regions of flesh-tone to the subsequent heuristic analysis. It has been found that, by removing such thin regions of flesh-tone, then more clean content than pornographic content is removed, thereby improving the ability of the subsequent heuristic analysis to correctly detect pornography.

Figure 2D:
FIGS. 2A to 2D are examples of a clean image during successive stages of analysis to remove thin regions.
Figure 2C:
Figure 2B:
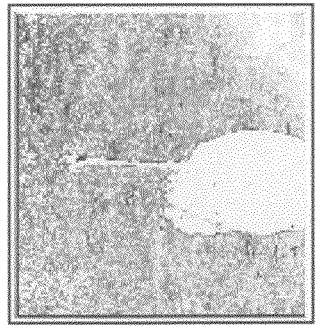
Figure 2A:
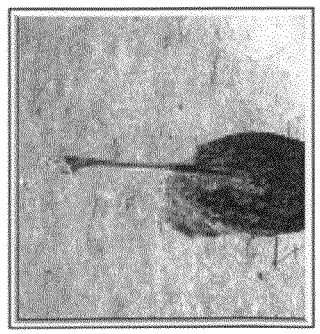
Figure 3D:
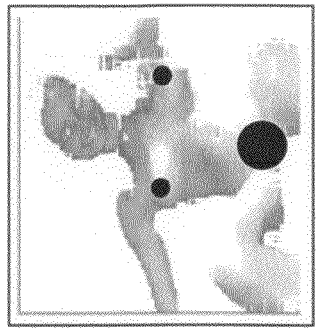
FIGS. 3A to 3D are examples of a pornographic image during successive stages of analysis to remove thin regions.
Figure 3C:
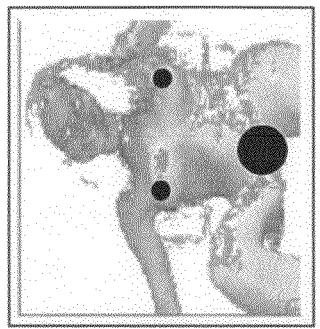
Figure 3B:
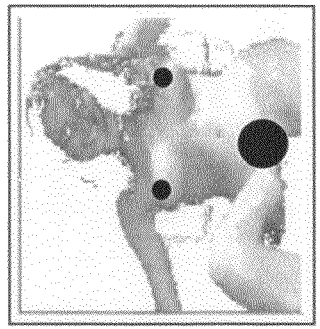
Figure 3A:
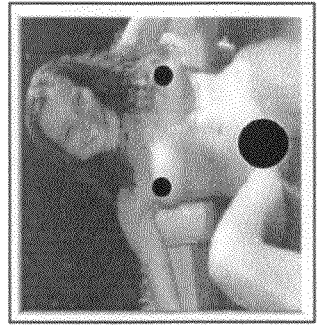

By way of example, FIGS. 2A to 2D and 3A to 3D illustrate the removal of the thin regions of a clean image and a pornographic image, respectively, in order to remove non-pornographic content. FIGS. 2A and 3A show the original images. FIGS. 2B and 3B show the images after processing by the flesh-tone filter 12 to identify the flesh-tone pixels. FIGS. 2C and 3C show the thin regions of the images which are to be removed. FIGS. 2D and 3D show the images after removal of the thin regions. FIG. 2A is an example of a clean image that by chance includes flesh-tones which are not pornographic content, in this case actually being merely part of a landscape. It can be seen from FIGS. 2C and 2D that for this image the removal of thin regions remove those pixels. Conversely, it can be seen from FIGS. 3C and 3D that the pornographic content is not removed.

There has been carried out a study of the effectiveness of this technique when applied as a pre-processing step in the analysis of 3,030 pornographic images and 5,089 clean images. The study examined the accuracy of detecting pornographic and clean images based on an assessment of flesh-tone content, with and without the removal of thin flesh-tone regions in the image. Final classification of an image as being pornographic was based on the percentage of flesh-tone content remaining following the pre-processing steps. The results are shown in the following table:

| Preprocessing steps | % flesh-tone required for classification as pornographic | % misclassified pornographic images | % misclassified clean images |
| --- | --- | --- | --- |
| Flesh-tone extraction | 37 | 27 | 23.98 |
| Flesh-tone extraction + thin region removal | 24 | 27 | 19.51 |

As can be seen from the table, with a given rate of 27% misclassification of pornographic images, the removal of the thin flesh-tone regions results in a reduction in the misclassification of clean images from 23.98% to 19.51%.

As these principles are generally applicable, this technique of using the thickness of regions of flesh-tone pixels as a measure indicating a reduced likelihood that the pixels contain pornographic content can be applied to any heuristic analysis using characteristics of flesh-tone regions as indicative of pornographic content, not just the specific heuristic analysis of the scanning system 1 presented here.

The above described operation of the thin region removal unit 13 is not limitative and variations are possible, for example as follows.

Rather than just considering the thickness in the vertical and horizontal directions, the thickness in other directions may also be considered. However this approach is more computationally expensive.

Instead of removing regions having a low thickness, the thickness can be used to indicate a reduced likelihood that the pixels contain pornographic content by being used as a weighting for measures of other characteristics of the flesh-tone pixels used as heuristic indicators of pornographic content.

Next, the image 10 is supplied to a small region removal unit 14 which processes the image 10 to detect and remove small regions of the pixels identified by the flesh-tone-filter 12.

In particular, the small region removal unit 14 analyses the pixels identified by the flesh-tone-filter 12, which have not been removed by the thin region removal unit 13, to determine the area of each region adjacent flesh-tone pixels.

The area of each such region of pixels is compared to a threshold. Any region of adjacent flesh-tone pixels having an area less than the threshold is removed from the image 10 and excluded from subsequent consideration.

The area of the regions and the threshold may be normalised by the total area of the image 10. In this case, the threshold is typically 5% or less, preferably 3% or less and is typically 0.5% or more, such percentages being percentages of the total area of the image 10. Preferably the threshold is 1%.

As an alternative to normalising the area, the threshold may be an absolute number of pixels.

The low area of regions thus detected is indicative of a reduced likelihood that the flesh-tone region contains pornographic content. This is because flesh-tone regions in pornographic images are typically relatively extensive. In accordance with this reduced likelihood, the removal of the small regions effectively reduces to zero the contribution of the small regions of flesh-tone to the subsequent heuristic analysis. It has been found that, by removing such small regions of flesh-tone, then more clean content than pornographic content is removed, thereby improving the ability of the subsequent heuristic analysis to correctly detect pornography.

Figure 4C:
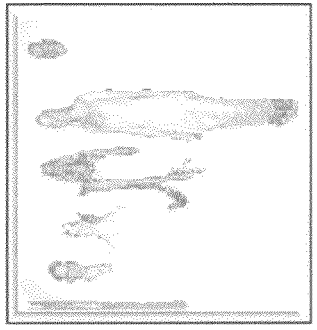
FIGS. 4A to 4C are examples of a clean image during successive stages of analysis to remove small regions.
Figure 4B:
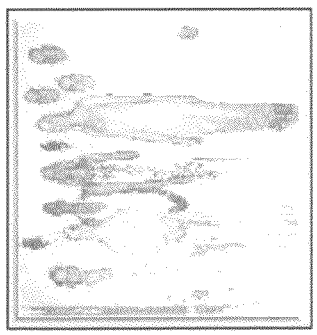
Figure 4A:
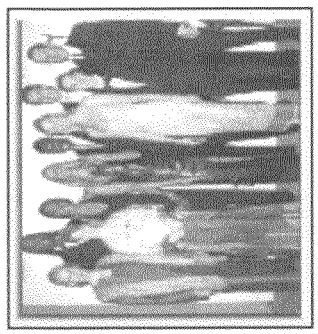
Figure 5C:
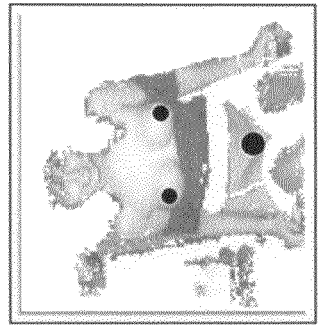
FIGS. 5A to 5C are examples of a pornographic image during successive stages of analysis to remove small regions.
Figure 5B:
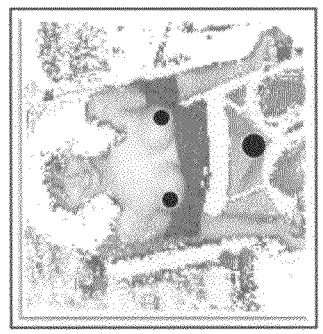
Figure 5A:

By way of example, FIGS. 4A to 4C and 5A to 5C illustrate the removal of the thin regions of a clean image and a pornographic image, respectively, in order to remove non-pornographic content. FIGS. 4A and 5A show the original images. FIGS. 4B and 5B show the images after processing by the flesh-tone filter 12 to identify the flesh-tone pixels. FIGS. 4C and 5C show the images after removal of the small regions. FIG. 4A is an example of a clean image that includes flesh-tones which are not pornographic content, in this case because the image is a portrait of clothed people. It can be seen from FIG. 4C that for this image the removal of small regions removes many of the regions of flesh, these being small because the people are clothed. Conversely, it can be seen from FIG. 5C that the pornographic content is not removed.

There has been carried out a study of the effectiveness of this technique when applied as a pre-processing step in the analysis of 3,030 pornographic images and 5,089 clean images. The study examined the accuracy of detecting pornographic and clean images based on an assessment of flesh-tone content, with and without the removal of small flesh-tone regions in the image. Final classification of an image as being pornographic was based on the percentage of flesh-tone content remaining following the pre-processing steps. The results are shown in the following table:

| Preprocessing steps | % flesh-tone required for classification as pornographic | % misclassified pornographic images | % misclassified clean images |
|---|---|---|---|
| Flesh-tone extraction | 37 | 27 | 23.98 |
| Flesh-tone extraction + small region removal | 33 | 27 | 22.78 |

As can be seen from the table, with a given rate of 27% misclassification of pornographic images, the removal of the small flesh-tone regions results in a reduction in the misclassification of clean images from 23.98% to 22.78%.

This technique can also be combined effectively with other pre-processing techniques to remove further irrelevant areas of images. For example, when the technique is combined with the prior removal of thin flesh-tone regions described above, in the study the two techniques worked in synergy to reduce the mis-classification of clean images to 18.19%.

As these principles are generally applicable, this technique of using the small area of regions of adjacent flesh-tone pixels as a measure indicating a reduced likelihood that the pixels contain pornographic content can be applied to any heuristic analysis using flesh-tone regions as an indicator of pornographic content, not just the specific heuristic analysis of the scanning system 1 presented here.

The above described operation of the small region removal unit 14 is not limitative and variations are possible, for example as follows.

Instead of removing regions having a low area, the area can be used to indicate a reduced likelihood that the pixels contain pornographic content by being used as a weighting for measures of other characteristics of the flesh-tone pixels used as heuristic indicators of pornographic content.

Next the image 10 is supplied to a segmentation unit 15 which performs a process of segmenting the pixels identified by the flesh-tone-filter 12 which have not been removed by the thin region removal unit 13 or the thin region removal unit 14.

One possible segmentation technique which may be implemented in the segmentation unit 15 is to group adjacent pixels into a single region if all the pixels are of a similar colour according to some predetermined criteria. For example, the criteria may be that an adjacent pixel is considered part of a region if its RGB values lie within a predetermined threshold, say 50 units, of the cumulative average of all pixels already in the region. This segmentation method enables the remaining image content to be divided into discrete regions at high speed. However, in general any segmentation technique may be used. Many segmentation techniques are known and may be applied. For example, alternative segmentation approaches could incorporate more sophisticated edge detection or region growth techniques, for example considering changes in texture as well as colour.

The segmented image 10 is then processed by a calculation unit 16.

The calculation unit 16 derives measures of different characteristics of each one of the regions of flesh-tone pixels derived by the segmentation unit 15. In particular the following measures are calculated:

(1) the average flesh-tone probability of all the pixels in the region, i.e. the average of the probabilities derived by the flesh-tone filter 12;

(2) the standard deviation of the grey-scaled colour values in the region, which is a measure of the curvature of the region;

(3) a measure of the texture of the region; and (4) a measure of the distance of the region from the centre of the image.

The measures (1) to (4) constitute a first subset of measures used by the analysis engine 17. Measure (1) is self-explanatory. Further description of the calculation of measures (2), (3) and (4), together with an explanation of how each is used to indicate the likelihood of the region containing pornographic content, is given below.

The measures derived by the calculation unit 16 are then processed by an analysis engine 17 which performs the following operation.

The analysis engine 17 applies layered heuristic tests 18 to identify particular classes or types of pornographic imagery. In particular, a series of layered heuristic tests 18 are performed to derive a result 19 that the image 10 should be classed as containing pornographic content.

Each heuristic test 18 first applies a rule to determine which of the segmented image regions could constitute pornographic content. This involves, in respect of each region, a comparison 20 of each of the measures (1) to (4) against a respective threshold. Based on that comparison 20, a region is deemed to be irrelevant, that is not to contain pornographic content, if any of the following criteria are met:

(a) the measure (1), being the average flesh-tone probability of the pixels in the region, is less than a given threshold;

(b) the measure (2), being the standard deviation of the grey-scaled colour values in the region, is less than a given threshold;

(c) the measure (3), being a measure of the texture of the region, is above a given threshold; or (d) the measure (4), being a measure of the distance of the region from the centre of the image, is above a given threshold value.

Following application of these criteria, a calculation 21 of two further measures of characteristics of the regions of flesh-tone pixels derived by the segmentation unit 15 which remain after excluding the regions deemed to be irrelevant by the comparison 20. The further measures are:

(5) the total area of the remaining regions, normalised by the total area of the image; and (6) the average flesh-tone score of the remaining regions.

The measures (5) and (6) constitute a second subset of measures used by the analysis engine 17. Then the measures (5) and (6) are used to derive the result 19. This involves a comparison 22 of each of the measures (5) and (6) against a respective threshold. Based on that comparison 22, the result 19 is that the image 10 contains pornographic content if either of the measures (5) and (6) exceed their threshold or that the image 10 does not contain pornographic content otherwise.

Of course the tests 18 may be performed in any order or in parallel depending on the available processing resources.

The results 19 of each test 18 are combined in a final classification step 23 to provide a classification 24 that the image 10 contains pornographic content or not. In particular, the classification 24 is that the image 10 contains pornographic content if the result 19 of any one of the tests 18 is that the image 10 contains pornographic content, or the classification 24 is that the image 10 does not contain pornographic content otherwise. Thus in this instance the results 19 are combined on the basis of taking the most severe result 19, but the method could combine the results of the tests 18 in other ways, for example providing a classification 24 that the image 10 contains pornographic content if the result 19 of a plural number or proportion of the tests 18 is that the image 10 contains pornographic content.

Before discussing the benefits of the layered heuristic analysis employing plural tests 18, the description will revert to the measures (2) to (4).

Measure (2) is the standard deviation of the grey-scaled colour values in the region. This is a measure of the curvature of the region, that is of the object which is imaged in the region. If the object is relatively curved, then the standard deviation is high, whereas if the object is relatively flat then the standard deviation is low. Any type of grey scale of the values of the pixels may be used. Most conveniently, the grey scale is brightness.

Other measures of curvature could equally be calculated, for example by modelling curvature using a more computationally expensive calculation.

A high curvature thus detected is indicative of an increased likelihood that the flesh-tone region contains pornographic content, whereas a low curvature is indicative of a decreased likelihood. This is because pornographic images typically contain large areas of naked human body parts. Generally speaking, human body parts are more curved than regions of an image which represent a flesh-tone but are in fact images of non-pornographic artificial man-made surfaces or computer generated backgrounds. In accordance with this increased likelihood with curvature, the removal of the flat (i.e. non-curved) regions by the comparison 20 of the tests 18 in the analysis engine 17 effectively reduces to zero the contribution of the flat regions of flesh-tone to the subsequent heuristic analysis in the calculation 20 and the comparison 22. It has been found that, by removing such flat regions of flesh-tone, then relatively more clean content than pornographic content is removed, thereby improving the ability of the subsequent heuristic analysis to correctly detect pornography.

Figure 6:
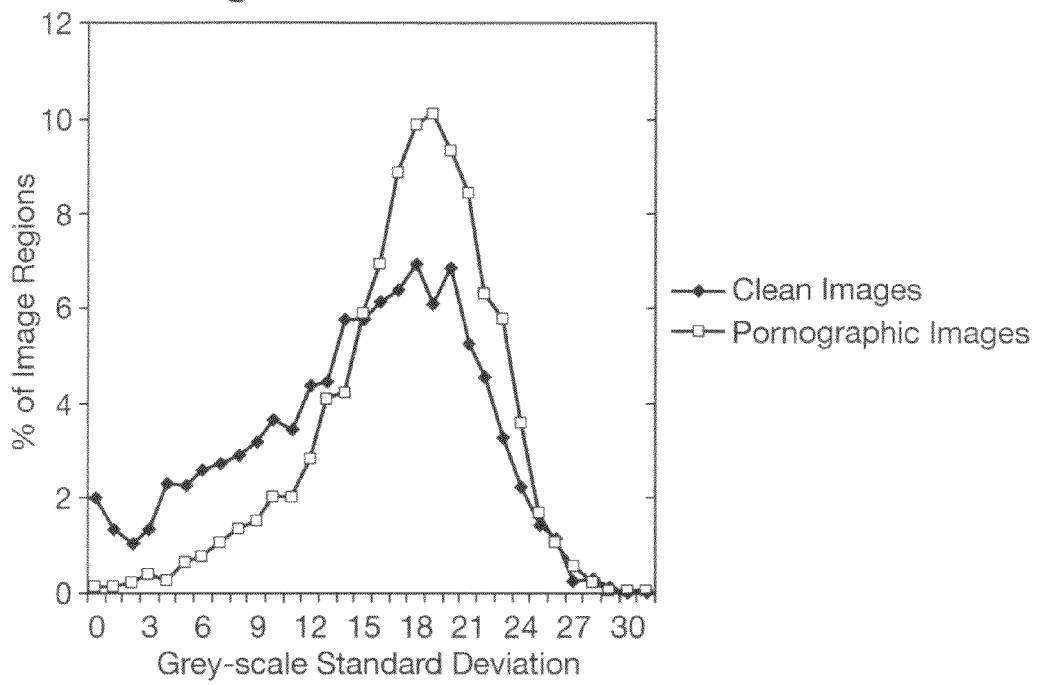
FIG. 6 is a graph of the percentage of regions in clean and pornographic images having different grey-scale standard deviations as a measure of curvature.

The fact that the measure of curvature is indicative that a region contains pornographic content may be demonstrated by deriving the measure for regions of a population of images pre-classified as containing pornographic content or not. In a study of a typical population, images were first filtered for flesh-tone and segmented into regions based on similarity of colour. The measure of curvature for each region was calculated and the results are shown in FIG. 6 in which the percentage of image regions is plotted against the standard deviation of the grey scale of the values of the pixels, averaged across the region. As can be seen, regions having a low curvature (for example a standard deviation below 15 in FIG. 6) are more common in clean images, whereas regions having a high curvature (for example a standard deviation above 15 in FIG. 6) are more common in pornographic images. In other words, flesh-tone regions of clean images tend to be flatter than flesh-tone regions of pornographic images.

Typical thresholds for the standard deviation of the grey-scaled colour values are as follows in the case that the units of the colour values have values in the range from 0 to 255. Typically the threshold is 30 or less. Typically the threshold is 5 or more. Preferably the threshold is 15.

Figure 7A:
FIGS. 7A to 7D are examples of a pornographic image during successive stages of analysis to remove flat regions.
Figure 7B:
Figure 7C:
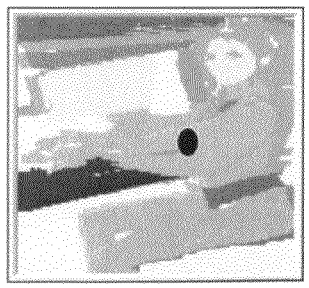
Figure 7D:

By way of example, FIGS. 7A to 7D illustrate the removal of the flat regions of an image containing flesh-tone regions including both pornographic and non-pornographic content. FIG. 7A shows the original image. FIG. 7B shows the image after processing by the flesh-tone filter 12 to identify the flesh-tone pixels (and after operation of the thin region removal unit 13 and the small region removal unit 14). FIG. 7C shows the flat regions of the image which are to be removed. FIG. 7D show a the image after removal of the flat regions. It can be seen from FIGS. 7C and 7D that the flat regions which are removed belongs to the background area of the image containing non-pornographic content, and by removing those flat regions it is possible to focus the heuristic analysis on the remaining flesh-tone regions which in this example do contain pornographic content.

There has been carried out a study of the effectiveness of the technique when applied as part of a wider heuristics analysis of 3,030 pornographic images and 5,089 clean images. Images were first pre-processed to identify significant regions of flesh-tones, segmented into regions of similar colour and were then subjected to a suite of heuristics for the detection of pornography. Prior to inclusion of a heuristic for the measure of flatness, the percentage of porn images misclassified as being clean was 26.90%, and the percentage of clean images misclassified as being pornographic was 11.66%. Following inclusion of a threshold value for the minimum flatness of a region, the misclassification rates improved to 26.56% misclassified porn images and 9.93% misclassified clean images.

The above described use of the measure of curvature is not limitative and variations are possible, for example as follows.

Instead of removing regions having a low curvature, the measure of curvature can be used to indicate an increased likelihood that the pixels contain pornographic content by the measure being used as a weighting for measures of other characteristics of the flesh-tone pixels used as heuristic indicators of pornographic content.

A possible combined test is a stringent test which excludes regions having a size greater than a threshold, for example 4% of the total area of the image in combination with a curvature lower than a predetermined limit less than the limit used for curvature by itself, for example a threshold of 4 using the units described above. This has been found useful to remove computer-generated backgrounds and cartoons which are typically completely flat blocks of colour.

Another variation is to vary the threshold applied depending on other properties of an image region. For example, it can be more appropriate to have more lenient thresholds towards the centre of the image 10 or in regions of very common skin tone.

Measure (3) is a measure of the degree of texture of the region, that is of the object which is imaged in the region. The measure of texture is averaged across each region.

In this case the measure of texture used is a combination of two of Laws' texture measures, in particular the SxLy measure and the LxSy measure. Laws' texture measures are in themselves known. They are derived by first applying small convolution kernels to the image, and then performing a non-linear windowing operation. The variables x and y are plural integers indicating the length of the kernels in the horizontal and vertical direction, preferably both being five, although other lengths could equally be applied. In the case that x and y equal five, S5 is (−1, 0, 2, 0, −1) and L5 is (1, 4, 6, 4, 1). L5S5 and S5L5 are derived by convolving L5 and S5.

However, other measures of texture could equally be calculated. Many different types of texture measure are known and may be applied here.

A low texture thus detected is indicative of an increased likelihood that the flesh-tone region contains pornographic content, whereas a high texture is indicative of a decreased likelihood. This is because pornographic images often contains large areas of naked human skin. These areas of skin are usually smooth and have a low texture when compared to other clean flesh-tone regions of images. In accordance with this decreased likelihood with texture, the removal of the textured regions by the comparison 20 of the tests 18 in the analysis engine 17 effectively reduces to zero the contribution of the textured regions of flesh-tone to the subsequent heuristic analysis in the calculation 20 and the comparison 22. It has been found that, by removing such textured regions of flesh-tone, then relatively more clean content than pornographic content is removed, thereby improving the ability of the subsequent heuristic analysis to correctly detect pornography.

Figure 8:
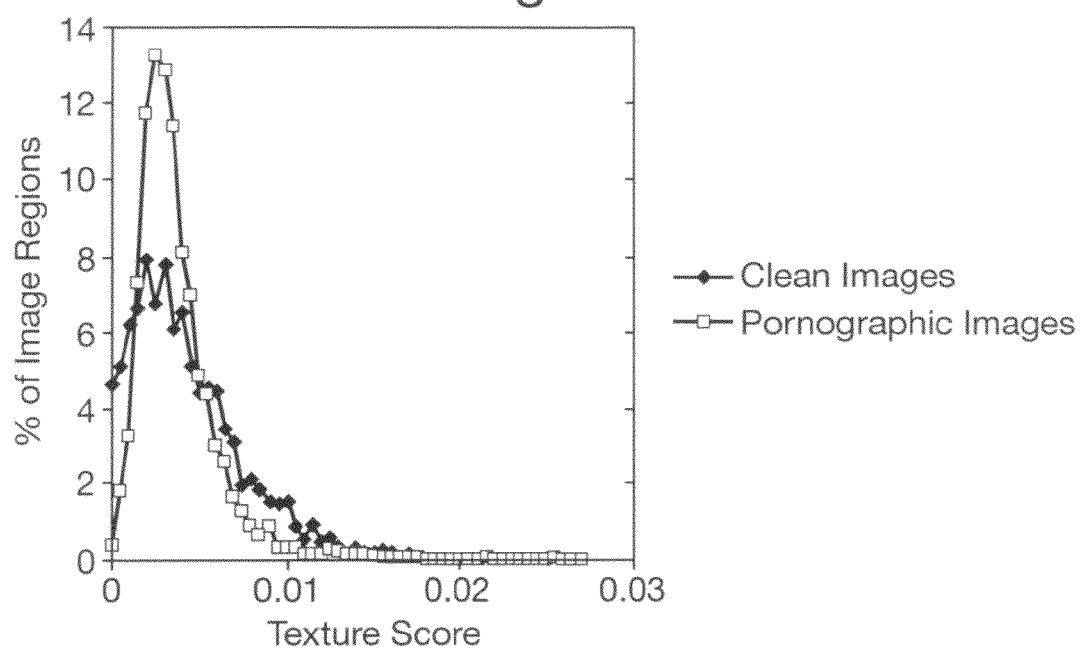
FIG. 8 is a graph of the percentage of regions in clean and pornographic images having different measures of texture.

The fact that the measure of texture is indicative that the regions contain pornographic content may be demonstrated by deriving the measure for regions of a population of images pre-classified as containing pornographic content or not. In a study of a typical population, images were first filtered for flesh-tone and segmented into regions based on similarity of colour. The measure of texture for each region was calculated and the results are shown in FIG. 8 in which the percentage of image regions is plotted against the texture measure, averaged across the region. The scores in this example were based on the Laws' L5S5 convolution matrix measure of texture. As can be seen, regions having a high texture (for example above about 0.005 in FIG. 8) are more common in clean images, whereas regions having a low texture (for example below about 0.005 in FIG. 8) are more common in pornographic images. In other words, flesh-tone regions of clean images tend to be more textured than flesh-tone regions of pornographic images.

Figure 9A:
FIGS. 9A to 9D are examples of a pornographic image during successive stages of analysis to remove distant regions from the centre of the image.
Figure 9B:
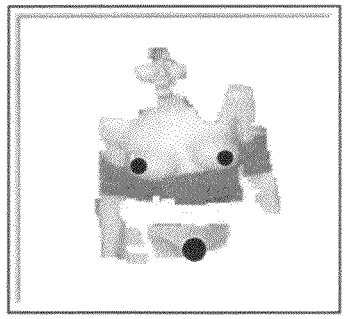
Figure 9C:
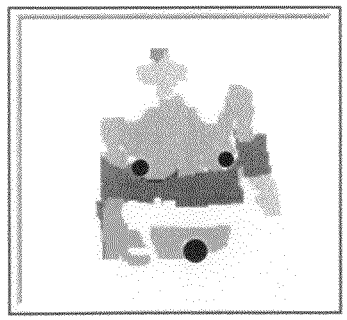
Figure 9D:
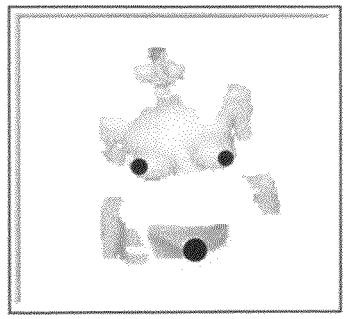

By way of example, FIGS. 9A to 9D illustrate the removal of the textured regions of an image containing flesh-tone regions including both pornographic and non-pornographic content. FIG. 9A shows the original image. FIG. 9B shows the image after processing by the flesh-tone filter 12 to identify the flesh-tone pixels (and after operation of the thin region removal unit 13 and the small region removal unit 14). FIG. 9C shows the textured regions of the image which are to be removed. FIG. 9D shows the image after removal of the textured regions. It can be seen from FIGS. 9C and 9D that the textured region which is removed belongs to an item of clothing pictured in the image i.e. non-pornographic content, and by removing this textured region it is possible to focus the heuristic analysis on the remaining flesh-tone regions which in this example do contain pornographic content.

There has been carried out a study of the effectiveness of the technique when applied as part of a wider heuristics analysis of 3,030 pornographic images and 5,089 clean images. Images were first pre-processed to identify significant regions of flesh-tones, segmented into regions of similar colour and were then subjected to a suite of heuristics for the detection of pornography. Prior to inclusion of the texture measures, the percentage of porn images misclassified as being clean was 26.90%, and the percentage of clean images misclassified as being pornographic was 13.60%. Following inclusion of maximum threshold values for the L5S5 and S5L5 Laws' texture energy measures calculated over the entire image flesh-tone content, the misclassification rates improved with 26.96% misclassified porn images and 11.68% misclassified clean images. Including a pre-segmentation step of flesh-tone regions to calculate texture energy measures over discrete regions of similar colour, this accuracy was further improved to 26.43% misclassified porn images and 9.95% misclassified clean images.

The above described use of the measure of texture is not limitative and variations are possible, for example as follows.

Instead of removing regions having a high texture, the measure of texture can be used to indicate a decreased likelihood that the pixels contain pornographic content by the measure being used as a weighting for measures of other characteristics of the flesh-tone pixels used as heuristic indicators of pornographic content.

Another approach is to calculate a single texture score for the whole image 10 or calculating multiple texture scores for discrete regions of the image. Both measures provide an effective method however the preferred approach is to segment the image 10 on the basis of colour before calculating texture scores for each of the image regions.

Another approach is to combine multiple measures of texture with different threshold sensitivities. The preferred approach is to combine the L5S5 and S5L5 Laws' convolution matrices measures of texture as this was found to cover the greatest range of relevant textures at the lowest computational cost.

The thresholds for the texture measure can be varied depending on other properties of the region. For example it can be more appropriate to having more lenient texture thresholds towards the centre of the image.

Measure (4) is a measure of the distance of the region from the centre of the image. The distance of each pixel in the region is averaged over the region to provide a measure of distance for the region as a whole.

Figure 10:
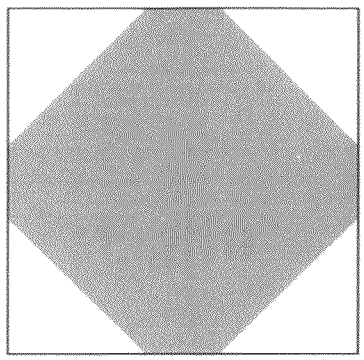
FIG. 10 is diagram illustrating an area within a 1-norm distance threshold.

The preferred measure of distance is a 1-norm distance. This may be calculated as the sum of the linear distance from the centre of the image 10 in the horizontal direction and the linear distance from the centre of the image 10 in the vertical direction. The distances may be expressed as percentages of the width and height of the image. Use of the 1-norm distance places particular emphasis against corner regions of images, for example as shown in FIG. 10 in which the square indicates the boundary of an image and the shaded area indicates the parts having a 1-norm distance less than a given threshold. Such a measure of distance weighted against the corners of the image 10 has been found to be particularly effective.

Figure 11:
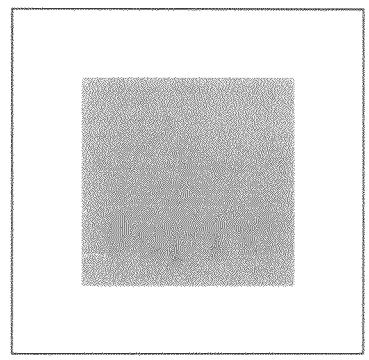
FIG. 11 is diagram illustrating an area within a Chebyshev distance threshold.

However, alternative measures of the distance from the centre of the image 10 can be used. One alternative is a simple Euclidean distance in which case the shaded area of FIG. 10 would change to be a circle (or ellipse depending on the weighting of the horizontal and vertical directions). This also would have the beneficial effect of weighting against the corners of the image, although less strongly than the 1-norm distance. Another alternative is the Chebyshev distance which may be derived by taking the maximum of the difference in the horizontal and vertical directions, before averaging over all pixels in the region. In this case the shaded area of FIG. 10 would change to be a square (or rectangle depending on the weighting of the horizontal and vertical directions) as shown in FIG. 11.

A low distance from the centre of the image 10 thus detected is indicative of an increased likelihood that the flesh-tone region contains pornographic content, whereas a high distance is indicative of a decreased likelihood. This is because pornographic images often contains large areas of naked human skin. These areas of skin are more likely to be located close to the centre of the image 10 as compared to other clean flesh-tone regions of images. In accordance with this decreased likelihood with distance from the centre of the image 10, the removal of the distant regions by the comparison 20 of the tests 18 in the analysis engine 17 effectively reduces to zero the contribution of the distant regions of flesh-tone to the subsequent heuristic analysis in the calculation 20 and the comparison 22. It has been found that, by removing such distant regions of flesh-tone, then relatively more clean content than pornographic content is removed, thereby improving the ability of the subsequent heuristic analysis to correctly detect pornography.

Figure 12:
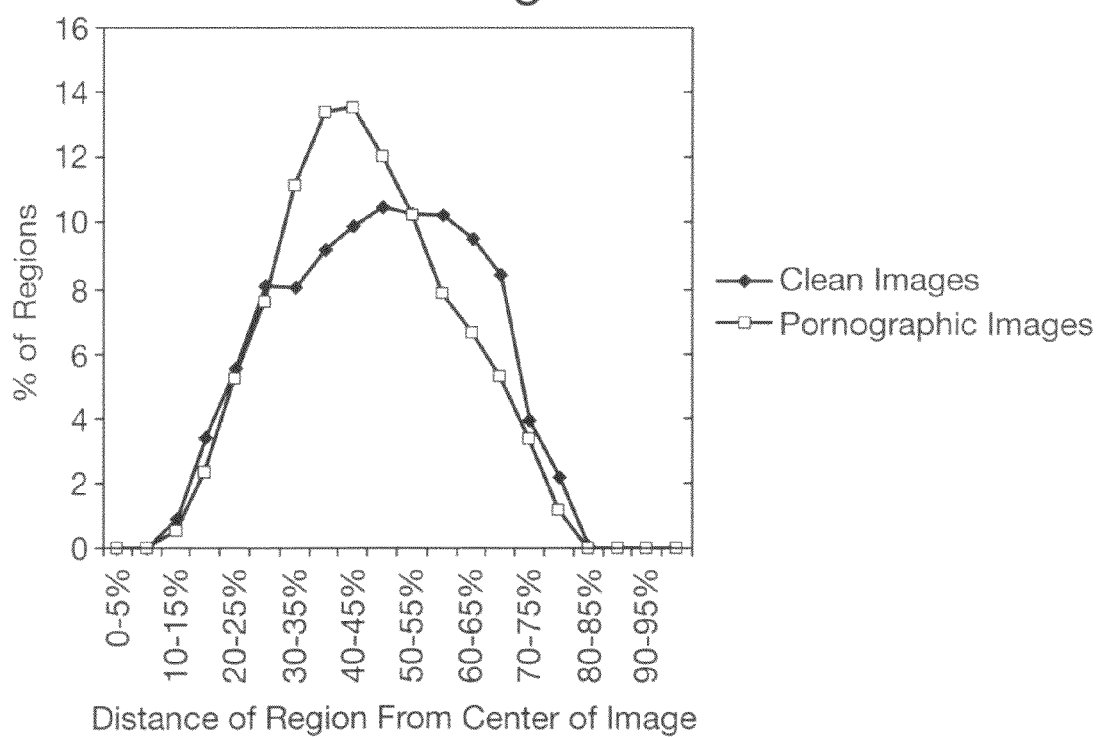
FIG. 12 is a graph of the percentage of regions in clean and pornographic images having different distances from the centre of the image.

The fact that the low measure of distance from the centre of the image 10 is indicative that the regions contain pornographic content may be demonstrated by deriving the measure for regions of a population of images pre-classified as containing pornographic content or not. In a study of a typical population, images were first filtered for flesh-tone and segmented into regions based on similarity of colour. The measure of distance from the centre of the image 10 for each region was calculated and the results are shown in FIG. 12 in which the percentage of image regions is plotted against the distance, expressed as a percentage of the maximum distance. As can be seen, regions having a high distance from the centre of the image 10 (for example above about 55% in FIG. 12) are more common in clean images, whereas regions having a low distance from the centre of the image 10 (for example below about 55% in FIG. 12) are more common in pornographic images. In other words, flesh-tone regions of clean images tend to be more distant from the centre of the image 10 than flesh-tone regions of pornographic images.

On the basis of this study, the preferred threshold for the distance is in the range of 30% to 55% at least when using a 1-norm distance. However, such a threshold is not limitative and also may vary for different measures of distance.

Figure 13A:
FIGS. 13A to 13D are examples of a pornographic image during successive stages of analysis to remove distant regions from the centre of the image.
Figure 13B:
Figure 13C:
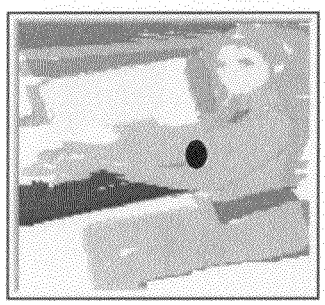
Figure 13D:
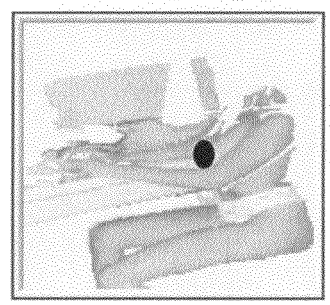

By way of example, FIGS. 13A to 13D illustrate the removal of the distant regions of an image containing flesh-tone regions including both pornographic and non-pornographic content. FIG. 13A shows the original image. FIG. 13B shows the image after processing by the flesh-tone filter 12 to identify the flesh-tone pixels (and after operation of the thin region removal unit 13 and the small region removal unit 14). FIG. 13C shows the distant regions of the image which are to be removed. FIG. 13D shows the image after removal of the distant regions. It can be seen from FIGS. 13C and 13D that the distant regions which are removed contain non-pornographic content, and by removing these distant regions it is possible to focus the heuristic analysis on the remaining flesh-tone regions which in this example do contain pornographic content.

There has been carried out a study of the effectiveness of the technique when applied as part of a wider heuristics analysis of 3,030 pornographic images and 5,089 clean images. Images were first pre-processed to identify significant regions of flesh-tones, segmented into regions of similar colour and were then subjected to a suite of heuristics for the detection of pornography. Prior to inclusion of a heuristic for the proximity of regions to the centre of the image, the percentage of pornographic images misclassified as being clean was 26.89%, and the percentage of clean images misclassified as being pornographic was 10.80%. Following inclusion of a threshold value for the maximum distance of a region from the centre of the image, the misclassification rates improved to 26.56% misclassified pornographic images and 9.93% misclassified clean images.

The above described use of the measure of distance from the centre of the image 10 is not limitative and variations are possible, for example as follows.

Instead of removing regions having a high distance from the centre of the image 10, the measure of distance can be used to indicate an decreased likelihood that the pixels contain pornographic content by the measure being used as a weighting for measures of other characteristics of the flesh-tone pixels used as heuristic indicators of pornographic content.

Another possible variation is to vary the maximum thresholds for the proximity of the region to the centre of the image, according to other properties of the region, for example, to have a more lenient threshold for regions which have a very common flesh-tone.

Another possible variation is to simply ignore all pixels of the image 10 having a distance from the centre of the image 10 above a threshold. Whilst this provides a similar benefit, it is not as effective as taking into account the average positions of image regions.

Lastly the benefits of the layered heuristic analysis employing plural tests 18 will be described.

In principle the analysis engine 17 could employ a single test 18, that is in which the final classification 24 is the same as the result 19 of that single test 18. A single test 18 will correctly identify a certain proportion of images containing pornographic content, but being effectively a Boolean determinant of whether an image is pornographic or not, will also tend to misclassify images which lie at the boundaries of the heuristic test 18. However, the use of plural tests 18 improves the performance of the heuristic analysis as compared to a single test 18, in the sense of achieving a better false positive rate for a given detection rate or vice versa.

In each test 18, the thresholds applied in criteria (a) to (e) are different and so the tests each identify different (although typically overlapping) subsets of images. This allows better performance to be achieved. The tests 18 can be thought of as being layered on top of each other each to identify increasing numbers of images containing pornography. By way of example, some tests 18 may identify the most common types of pornographic content, while other tests 18 which are more lenient in some ways and more stringent in other ways may identify less common types of pornographic content. The varying significance of the characteristics within the different tests 18, allows each test 18 to be optimised be more precise in its discrimination task, and has the effect of reducing overall misclassification rates when compared to use of a single test 18.

The tests 18 may be optimised using a reference corpus of images previously classified as containing pornographic content or not. The reference corpus must be sufficiently large. A preferred population size would be over 5,000 images.

Such optimisation for the general case of a single heuristic test is known and essentially involves iterative modification of the significance of the characteristics (in this case by modifying the thresholds) whilst monitoring the resultant performance.

Where several tests 18 are to be employed optimisation proceeds as follows.

First, a single test 18 is optimised so that a small percentage of the clean images are misclassified as being pornographic (low false positive rate), while at the same time attempting to maximise the proportion of pornographic images correctly classified (high detection rate). Typically a target for the percentage of clean images misclassified should be very small, for example 1%.

Next, all the images from the reference corpus that have been classified as being pornographic are removed and the next test 18 is optimised against the remainder of the reference corpus. This process is repeated for subsequent tests 18 until an acceptable balance is achieving between the misclassification of clean images and pornographic images.

Figure 14:
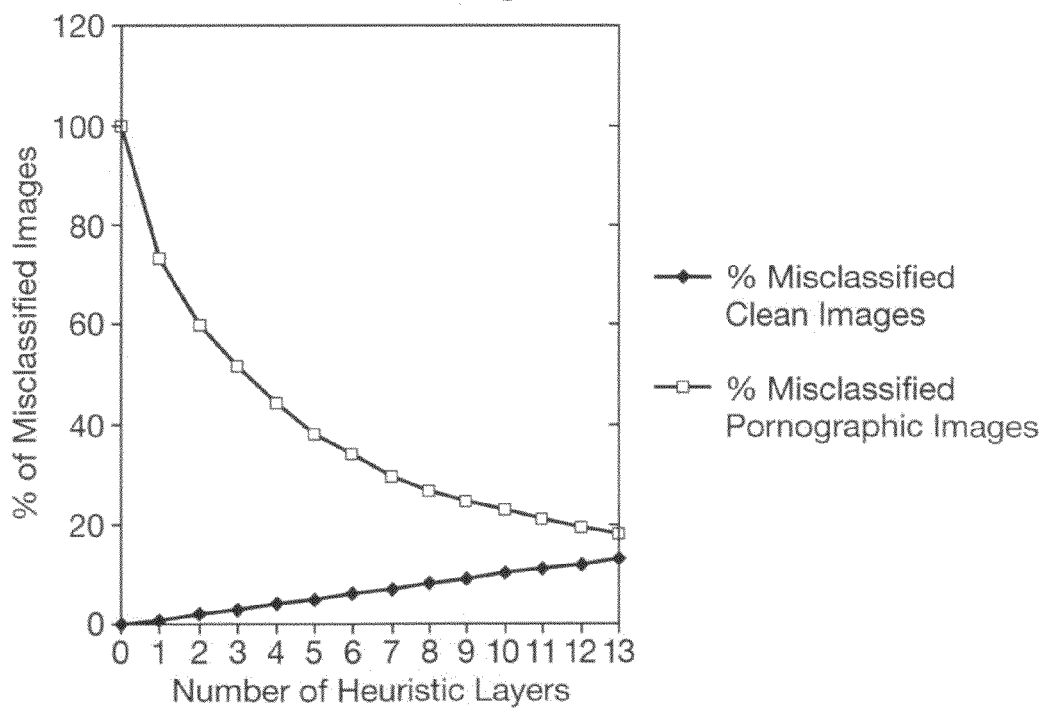
FIG. 14 is a graph of the detection rate and false positive rate of a layered heuristic analysis against the number of layers.

In this manner each additional test 18 allows the detection rate to be improved, albeit at the expense of worsening the false positive rate. An example of this is illustrated in FIG. 14 which plots the percentage of misclassified clean and pornographic images against the number of heuristic tests 18 used. Although the number false positive rate worsens with the number of tests 18, it remains the case that the performance of a single test 18 is worse than when using plural tests 18, for example by making the comparison with optimisation to provide a fixed false positive rate or a fixed detection rate.

The number of tests 18 can be varied. Typically increasing the number of tests improves the classification accuracy, although the gains become more marginal as the number of tests increase. There are a few competing factors. Firstly it takes a significant time, say half an hour or so of focussed manpower effort, to optimise the threshold values for a given test. This means that 13 heuristics takes a day to optimise, which is resource intensive in terms of personnel cost, and man power cost increases linearly with the number of heuristic layers developed, bearing in mind that the optimisation may need to be repeated as the reference corpus grows. Secondly as the number of layers of heuristics increases, so does the risk that the heuristic suite has been trained specifically against the target set of images, a risk that is mitigated by increasing the size of the reference corpus. However, the processing requirements are less of an issue. The actual application of the tests is the quickest part of the method, because all the image region properties have been calculated before this. Thus hundreds of tests could be performed in sub-millisecond timescales.

A preferred implementation is to have thirteen tests 18, each identifying progressively more pornographic images at the expense of an additional 1% increase in the proportion of misclassified clean images. Adding more heuristic tests 18 with a finer granularity between each test 18 is possible.

FIG. 14 is derived from a study of the effectiveness of the technique when applied as part of a wider heuristics analysis of 3,030 pornographic images and 5,089 clean images. When optimising a single layer of heuristics over the same image set, an accuracy of 14.56% misclassified clean images and 18.7% misclassified pornographic images can be achieved. However after applying the thirteen successive heuristics layers a much improved accuracy of 13.0% misclassified clean images and 18.1% misclassified pornographic images is achieved. Thus the improvement in accuracy can be seen The above described implementation of a layered heuristic analysis is not limitative and variations are possible, for example as follows Instead of an analysis in which the significance of the characteristics is controlled by corresponding thresholds, the technique may be applied to an analysis in which the significance of one or more characteristics is controlled by the measure affecting a weighting for measures of other characteristics of the flesh-tone pixels used as heuristic indicators of pornographic content.

The optimisation can be varied, for example by executing the optimisation of each test 18 against opposite populations. For example where each test 18 is optimised with the aim of a small percentage of the pornographic images being misclassified as being clean, while at the same time attempting to maximise the proportion of clean images correctly classified.

As well as providing good accuracy as discussed above, the scanning system 1 also provides a relatively low latency and has relatively low processing requirements. This is due to the fact that the heuristic analysis uses characteristics for which measures are straightforward to derive and process using conventional computer systems. Generally the measures require a minimum amount of data to be maintained as the measure is being calculated. For example, the texture measure calculation can be carried out over the image row-by-row, or column-by-column. This means that the measure calculation is amenable to parallel processing (or hardware implementation), where multiple calculations can be performed at once, and then the results aggregated. This enables latency and processing requirements to be reduced. Similarly, the measures used are generally simple. For example standard deviation as a measure of flatness is much quicker to calculate than, for example, calculating gradients to measure curvature. Segmentation is one of the slowest parts of the algorithm, but a simple segmentation by colour is applied to provide a relatively fast implementation (although this is not novel in itself). The method generally avoids using trigonometry and other expensive mathematical calculations and tend to rely on simple addition and division. The algorithms don't require too much accuracy and so can be implemented using floating point numbers and short unsigned integers and so on to conserve memory utilisation.

Of course many variations to the above described method are possible. Some variations are described above.

Another variation is as follows. The measures described above each increase with the characteristic concerned, that is the value of the measure increases as the amount of the characteristic increases. Alternatively, one could select measures which decrease with the characteristic concerned, for example by calculating the inverse of the above-described measures. The inverse of the measure of curvature, for example, might be described as a measure of flatness or a measure of non-curvature. Such a measure of an inverse quantity will indicate an opposite effect on the likelihood that the region of identified pixels contains pornographic content. However such use of a measure of an inverse quantity is a mere mathematical change which is logically the same as the use of the measures of the quantities above. For example a measure of a quantity being above a threshold is logically identical to a measure of the inverse quantity being below a corresponding inverse threshold. Thus such use of measures of quantities inverse to the above-described quantities is within the scope of the invention.

The invention claimed is:

1. A system for scanning images for pornographic content comprising:
    identifying, in a computer, pixels of an image representing a flesh-tone;
    performing, in the computer, a heuristic analysis of the image which classifies the image as being pornographic or not using measures of predetermined characteristics of the identified pixels used to indicate a likelihood that the identified pixels contain pornographic content or not,
    wherein a first one of the characteristics is the thickness of a region of identified pixels, the measure of said thickness being used to indicate a likelihood that the region of identified pixels contains pornographic content which decreases when the measure of said thickness decreases;
    further wherein a second one of the characteristics is the curvature of a region of adjacent identified pixels, the measure of the curvature being used to indicate a likelihood of the identified pixels contain pornographic content which increases when the measure of curvature increases; and
    identifying a first region within the image that has a curvature less than a predefined threshold, and removing that first region from further heuristic analysis.

2. A system according to claim 1, wherein the heuristic analysis comprises:
    identifying, in the computer, irrelevant regions of identified pixels which have a thickness less than a predetermined threshold; and
    classifying, in the computer, the image as being pornographic or not using measures of a subset of at least one predetermined characteristic of the identified pixels excluding the irrelevant regions.

3. A system according to claim 2, wherein said step of identifying, in the computer, irrelevant regions of identified pixels comprises identifying irrelevant regions which have a thickness, normalized by a characteristic dimension of the image, less than said predetermined threshold.

4. A system according to claim 3, wherein said predetermined threshold is 10% or less of said characteristic dimension.

5. A system according to claim 3, wherein said predetermined threshold is 1% or more of said characteristic dimension.

6. A system according to claim 3, wherein the characteristic dimension of the image is selected from the group of: the width of the image, the height of the image, or the average of the width and height of the image.

7. A system according to claim 2, wherein said step of identifying, in the computer, irrelevant regions of identified pixels comprises identifying irrelevant regions of identified pixels which have a thickness in the horizontal direction less than a predetermined threshold or a thickness in the vertical direction less than a predetermined threshold.

8. A system according to claim 2, wherein the step of identifying, in the computer, irrelevant regions of identified pixels further comprises identifying, in the computer, further irrelevant regions of identified pixels which are unlikely to contain pornography on the basis of a comparison of a measure of at least one further characteristic with a respective threshold.

9. A system according to claim 2, wherein said step of classifying, in the computer, the image as pornographic or not using a measure of a subset of at least one predetermined characteristic comprises classifying the image as pornographic or not on the basis of a comparison of the measures of each measure of a subset of at least one predetermined characteristic of the identified pixels excluding the irrelevant regions with a respective threshold.

10. A system of scanning images for pornographic content, the system comprising:
 identifying, in a computer, pixels of an image representing a flesh-tone; and
 performing, in the computer, a heuristic analysis of the image which classifies the image as being pornographic or not using measures of predetermined characteristics of the identified pixels to indicate a likelihood that the identified pixels contain pornographic content or not,
 wherein one of the characteristics is the area of a region of adjacent identified pixels, the measure of said area being used to indicate a likelihood that the region of identified pixels contains pornographic content which decreases when the measure of said area decreases; and
 identifying a first region within the image that has a curvature less than a predefined threshold, and removing that first region from further heuristic analysis.

11. A system according to claim 10, wherein the heuristic analysis comprises:
 identifying, in the computer, irrelevant regions of identified pixels which have an area less than a predetermined threshold; and
 classifying, in the computer, the image as being pornographic or not using measures of a subset of at least one predetermined characteristic of the identified pixels excluding the irrelevant regions.

12. A system according to claim 11, wherein said step of identifying, in the computer, irrelevant regions of identified pixels comprises identifying irrelevant regions which have an area, normalized by the total area of the image, less than said predetermined threshold.

13. A system according to claim 12, wherein said predetermined threshold is 5% or less of the total area of the image.

14. A system according to claim 12, wherein said predetermined threshold is 3% or less of the total area of the image.

15. A system according to claim 12, wherein said predetermined threshold is 0.5% or more of the total area of the image.

16. A system according to claim 11, wherein the step of identifying, in the computer, irrelevant regions of identified pixels further comprises identifying further irrelevant regions of identified pixels which are unlikely to contain pornography on the basis of a comparison of a measure of at least one further characteristic with a respective threshold.

17. A system according to claim 11, wherein said step of classifying, in the computer, the image as pornographic or not using a measure of a subset of at least one predetermined characteristic comprises classifying, in the computer, the image as pornographic or not on the basis of a comparison of the measures of each measure of a subset of at least one predetermined characteristic of the identified pixels excluding the irrelevant regions with a respective threshold.

18. A system of scanning images for pornographic content, the method comprising:
 identifying, in a computer, pixels of an image representing a flesh-tone; and
 performing, in the computer, a heuristic analysis of the image which classifies the image as being pornographic or not using measures of predetermined characteristics of the identified pixels to indicate a likelihood that the identified pixels contain pornographic content or not,
 wherein one of the characteristics is the curvature of a region of adjacent identified pixels, the measure of the curvature being used to indicate a likelihood of the identified pixels contain pornographic content which increases when the measure of curvature increases; and
 identifying a first region within the image that has a curvature less than a predefined threshold, and removing that first region from further heuristic analysis.

19. A system according to claim 18, wherein the heuristic analysis comprises:
 identifying, in the computer, irrelevant regions of identified pixels which have a measure of curvature less than a predetermined threshold; and
 classifying, in the computer, the image as being pornographic or not using measures of a subset of at least one predetermined characteristic of the identified pixels excluding the irrelevant regions.

20. A system according to claim 19, wherein the measure of curvature is the standard deviation of a grey scale of the pixels in the region of adjacent identified pixels.

21. A system according to claim 20, wherein the grey scale is brightness.

22. A system according to claim 20, wherein the pixels have color values represented by values in the range from 0 to 255 and the threshold is 30 or less.

23. A system according to claim 20, wherein the pixels have color values represented by values in the range from 0 to 255 and the threshold is or more.

24. A system according to claim 19, wherein the step of identifying, in the computer, irrelevant regions of identified pixels further comprises identifying further irrelevant regions of identified pixels which are unlikely to contain pornography on the basis of a comparison of a measure of at least one further characteristic with a respective threshold.

25. A system for scanning images for pornographic content, the system comprising:
 identifying pixels of an image representing a flesh-tone; and
 performing, in a computer, a heuristic analysis of the image which classifies the image as being pornographic or not using measures of predetermined characteristics of the identified pixels to indicate a likelihood that the identified pixels contain pornographic content or not,
wherein a first one of the characteristics is a distance of identified pixels from the center of the image, the measure of a distance of identified pixels from the center of the image being used to indicate a likelihood of the identified pixels contain pornographic content which decreases when the measure increases;
further wherein a second one of the characteristics is the curvature of a region of adjacent identified pixels, the measure of the curvature being used to indicate a likelihood of the identified pixels contain pornographic content which increases when the measure of curvature increases; and
identifying a first region within the image that has a curvature less than a predefined threshold, and removing that first region from further heuristic analysis.

26. A system according to claim 25, wherein the heuristic analysis comprises:
identifying, in a computer, irrelevant regions of adjacent identified pixels which are regions of adjacent identified pixels having a measure of a distance of the region from the center of the image greater than a predetermined threshold; and
classifying, in the computer, the image as being pornographic or not using measures of a subset of at least one predetermined characteristic of the identified pixels excluding the irrelevant regions; and
identifying a first region within the image that has a curvature less than a predefined threshold, and removing that first region from further heuristic analysis.

27. A system according to claim 26, wherein said distance is a 1-norm distance.

28. A system according to claim 26, wherein said distance is a Euclidean distance.

29. A system according to claim 26, wherein said distance is the Chebyshev distance.

30. A system according to claim 26, wherein said step of identifying, in the computer, irrelevant regions of identified pixels comprises identifying irrelevant regions are regions of adjacent identified pixels having a distance from the center of the image, normalized by the maximum distance in the image from the center of the image, less than said predetermined threshold.

31. A system according to claim 30, wherein said distance is a 1-norm distance and said predetermined threshold is in the range from 30% to 55% of said maximum distance.

32. A system according to claim 26, wherein said measure of a distance of the region from the center of the image is a measure of the average distance from the center of the image of the pixels in the region.

33. A system according to claim 26, wherein the step of identifying, in the computer, irrelevant regions of identified pixels further comprises identifying further irrelevant regions of identified pixels which are unlikely to contain pornography on the basis of a comparison of a measure of at least one further characteristic with a respective threshold.

34. A system according to claim 26, wherein said step of classifying, in the computer, the image as pornographic or not using a measure of a subset of at least one predetermined characteristic comprises classifying the image as pornographic or not on the basis of a comparison of the measures of each measure of a subset of at least one predetermined characteristic of the identified pixels excluding the irrelevant regions with a respective threshold.

35. A system of scanning images for pornographic content, the method comprising:
identifying, in a computer, pixels of an image representing a flesh-tone; and
performing, in the computer, a heuristic analysis of the image which classifies the image as being pornographic or not using measures of predetermined characteristics of the identified pixels to indicate a likelihood that the identified pixels contain pornographic content or not,
wherein a first one of the characteristics is the texture of a region of adjacent identified pixels, the measure of the texture of the region being used to indicate a likelihood of the identified pixels contain pornographic content which decreases when the measure of flatness increases;
further wherein a second one of the characteristics is the curvature of a region of adjacent identified pixels, the measure of the curvature being used to indicate a likelihood of the identified pixels contain pornographic content which increases when the measure of curvature increases; and
identifying a first region within the image that has a curvature less than a predefined threshold, and removing that first region from further heuristic analysis.

36. A system according to claim 35, wherein the heuristic analysis comprises:
identifying, in the computer, irrelevant regions of identified pixels which have a measure of the texture of the region greater than a predetermined threshold; and
classifying, in the computer, the image as being pornographic or not using measures of a subset of at least one predetermined characteristic of the identified pixels excluding the irrelevant regions.

37. A system according to claim 36, wherein the measure of the degree of texture is at least one of Laws' texture measures.

38. A system according to claim 36, wherein the at least one of Laws' texture measures is the SxLy texture measure, the LxSy texture measure or a combination of the SxLy texture measure and the LxSy texture measure, wherein x and y are respective integers of three or more.

39. A system according to claim 36, wherein x and y both equal five.

40. A system according to claim 36, wherein the measure of the texture of the region is a measure of the texture averaged across the region.

41. A system according to claim 36, wherein the step of identifying, in the computer, irrelevant regions of identified pixels further comprises identifying further irrelevant regions of identified pixels which are unlikely to contain pornography on the basis of a comparison of a measure of at least one further characteristic with a respective threshold.

42. A system according to claim 36, wherein said step of classifying, in the computer, the image as pornographic or not using a measure of a subset of at least one predetermined characteristic comprises classifying, in the computer, the image as pornographic or not on the basis of a comparison of the measures of each measure of a subset of at least one predetermined characteristic of the identified pixels excluding the irrelevant regions with a respective threshold.

43. A system of scanning images for pornographic content, the method comprising:
identifying, in a computer, pixels of an image representing a flesh-tone; and
performing, in the computer, a heuristic analysis of the image which classifies the image as being pornographic or not using measures of a set of predetermined characteristics of the identified pixels to indicate a likelihood that the identified pixels contain pornographic content or not;

wherein one of the characteristics is the curvature of a region of adjacent identified pixels, the measure of the curvature being used to indicate a likelihood of the identified pixels contain pornographic content which increases when the measure of curvature increases, further wherein the heuristic analysis comprises performing a plurality of tests, each test using the set of predetermined characteristics, with degrees of significance attributed to each characteristic which are different within each test, to derive a result that the image is pornographic or not, and classifying the image as being pornographic or not on the basis of a combination of the results of the plurality of tests; and identifying a first region within the image that has a curvature less than a predefined threshold, and removing that first region from further heuristic analysis.

44. A system according to claim 43, wherein said step of classifying, in the computer, the image as being pornographic or not on the basis of a combination of the results of the plurality of tests comprises classifying the image as being pornographic if anyone of the results of the plurality of tests is that the image is pornographic and otherwise classifying the image as not pornographic.

45. A system according to claim 43, wherein each test includes comparison of the set of predetermined characteristics with respective thresholds which attribute said degrees of significance to the characteristics, the thresholds being different within each test.

46. A system according to claim 43, wherein each test comprises:

identifying, in the computer, irrelevant regions of identified pixels which are unlikely to contain pornography on the basis of a comparison of the measures of a first subset of at least one characteristic with respective thresholds which are different within each test; and deriving, in the computer, a result that the image is pornographic or not using a second subset of at least one predetermined characteristic of the identified pixels excluding the irrelevant regions.

47. A system according to claim 46, wherein said step of deriving, in the computer, a result that the image is pornographic or not using a second subset of predetermined characteristics comprises deriving, in the computer, a result that the image is pornographic or not on the basis of a comparison of the measures of a second subset of predetermined characteristics of the identified pixels excluding the irrelevant regions with respective thresholds which are different within each test.

48. A system according to claim 43, wherein one of the characteristics is the thickness of a region of identified pixels, the measure of said thickness being used to indicate a likelihood that the region of identified pixels contains pornographic content which decreases when the measure of said thickness decreases.

49. A system according to claim 43, wherein one of the characteristics is the area of a region of adjacent identified pixels, the measure of said area being used to indicate a likelihood that the region of identified pixels contains pornographic content which decreases when the measure of said area decreases.

50. A system according to claim 43, wherein one of the characteristics is the flatness of a region of adjacent identified pixels, the measure of the flatness being used to indicate a likelihood of the identified pixels contain pornographic content which decreases when the measure of flatness increases.

51. A system according to claim 43, wherein one of the characteristics is a distance of pixels from the center of the image, the measure of a distance of pixels from the center of the image being used to indicate a likelihood of the identified pixels contain pornographic content which decreases when the measure of distance increases.

52. A system according to claim 43, wherein one of the characteristics is the texture of a region of adjacent identified pixels, the measure of the texture being used to indicate a likelihood of the identified pixels contain pornographic content which decreases when the measure of texture increases.

53. A system according to claim 43, wherein one of the characteristics is the likelihood of the identified pixels being flesh-tone, the measure of the likelihood of the identified pixels being flesh-tone being used to indicate a likelihood of the identified pixels contain pornographic content which increases when the measure of likelihood increases.

54. A system according to claim 43, wherein one of the characteristics is the area of the identified pixels, the measure of the area being used to indicate a likelihood of the identified pixels contain pornographic content which increases when the measure of area increases.

* * * * *

UNITED STATES PATENT AND TRADEMARK OFFICE
CERTIFICATE OF CORRECTION

PATENT NO. : 8,358,846 B2  
APPLICATION NO. : 11/984093  
DATED : January 22, 2013  
INVENTOR(S) : Nicholas Gibbs Page 1 of 1

It is certified that error appears in the above-identified patent and that said Letters Patent is hereby corrected as shown below:

In the Claims

In Column 20, Lines 47-48, Claim 1, replace "likelihood of" with --likelihood that--;
In Column 22, Line 29, Claim 18, replace "likelihood of" with --likelihood that--;
In Column 22, Line 54, Claim 23, replace "is or more" with --is 5 or more--;
In Column 23, Line 6, Claim 25, replace "likelihood of" with --likelihood that--;
In Column 23, Lines 11-12, Claim 25, replace "likelihood of" with --likelihood that--;
In Column 23, Line 40, Claim 30, between "irrelevant regions" and "are regions", insert --which--;
In Column 24, Lines 12-13, Claim 35, replace "likelihood of" with --likelihood that--;
In Column 24, Lines 17-18, Claim 35, replace "likelihood of" with --likelihood that--;
In Column 25, Line 3, Claim 43, replace "likelihood of" with --likelihood that--;
In Column 25, Line 21, Claim 44, replace "anyone" with --any one--;
In Column 26, Line 20, Claim 50, replace "likelihood of" with --likelihood that--;
In Column 26, Line 25, Claim 51, replace "likelihood of" with --likelihood that--;
In Column 26, Line 31, Claim 52, replace "likelihood of" with --likelihood that--;
In Column 26, Line 36, Claim 53, replace "likelihood of" with --likelihood that--; and
In Column 26, Line 41, Claim 54, replace "likelihood of" with --likelihood that--.

Signed and Sealed this  
Twenty-second Day of October, 2013

Teresa Stanek Rea  
*Deputy Director of the United States Patent and Trademark Office*